US009366418B2

(12) United States Patent
Gifford

(10) Patent No.: US 9,366,418 B2
(45) Date of Patent: Jun. 14, 2016

(54) METHOD, APPARATUS AND SYSTEM FOR CONNECTING A LIGHT EMITTING DIODE LIGHT FIXTURE TO A MAINS POWER CONDUCTOR

(76) Inventor: Graham Gifford, Burnaby (CA)

( * ) Notice: Subject to any disclaimer, the term of this patent is extended or adjusted under 35 U.S.C. 154(b) by 1106 days.

(21) Appl. No.: 13/250,240

(22) Filed: Sep. 30, 2011

(65) Prior Publication Data

US 2013/0083529 A1 Apr. 4, 2013

(51) Int. Cl.
| F21V 21/00 | (2006.01) |
| F21V 21/03 | (2006.01) |
| F21V 23/06 | (2006.01) |
| H02G 3/20 | (2006.01) |
| F21S 8/00 | (2006.01) |
| F21S 8/04 | (2006.01) |
| F21Y 101/02 | (2006.01) |

(52) U.S. Cl.
CPC .............. *F21V 21/03* (2013.01); *F21V 23/06* (2013.01); *H02G 3/20* (2013.01); *F21S 8/033* (2013.01); *F21S 8/04* (2013.01); *F21Y 2101/02* (2013.01); *Y10T 29/49002* (2015.01)

(58) Field of Classification Search
CPC .......... F21S 8/033; F21V 21/00; F21V 21/03; F21V 23/06
USPC .......................................... 362/147, 221, 365
See application file for complete search history.

(56) References Cited

U.S. PATENT DOCUMENTS

| 3,836,766 A | 9/1974 | Auerbach |
| 4,367,370 A | 1/1983 | Wilson et al. |
| 4,976,633 A | 12/1990 | Beghelli |
| 5,562,343 A * | 10/1996 | Chan et al. ..................... 362/365 |
| 6,156,971 A | 12/2000 | May |
| 6,322,232 B1 | 11/2001 | Oliver |
| 6,465,735 B2 | 10/2002 | May |
| 6,563,049 B2 | 5/2003 | May |
| 6,617,513 B1 | 9/2003 | Wu |
| 6,679,647 B2 | 1/2004 | Hixon |
| 6,780,050 B1 | 8/2004 | Wu |
| 6,851,830 B2 | 2/2005 | Wu |
| 6,899,447 B2 | 5/2005 | Wu |
| 7,357,541 B2 | 4/2008 | Gamache et al. |
| 7,387,522 B2 | 6/2008 | Janos et al. |
| 8,021,035 B2 * | 9/2011 | Anglikowski et al. ........ 362/655 |
| 2008/0232116 A1 * | 9/2008 | Kim .............................. 362/365 |

FOREIGN PATENT DOCUMENTS

GB 618701 2/1949

* cited by examiner

*Primary Examiner* — Karabi Guharay
(74) *Attorney, Agent, or Firm* — Kilpatrick Townsend & Stockton LLP

(57) ABSTRACT

A method, apparatus and system for connecting a light fixture having a light emitting diode (LED) lighting element to a mains power conductor in an electrical junction box is disclosed. The apparatus includes a support configured to attach to the electrical junction box and an electrical converter operable to receive electrical power from the mains power conductor and to generate an output power suitable for powering the LED lighting element. The apparatus also includes an output connector disposed on the support and in electrical connection with the electrical converter for receiving the output power, the output connector being operable to receive a connector of the light fixture for powering the LED lighting element, the output connector being oriented to receive the connector of the light fixture when the support is attached to the electrical junction box.

12 Claims, 4 Drawing Sheets

METHOD, APPARATUS AND SYSTEM FOR CONNECTING A LIGHT EMITTING DIODE LIGHT FIXTURE TO A MAINS POWER CONDUCTOR

BACKGROUND OF THE INVENTION

1. Field of Invention

This invention relates generally to light emitting diode (LED) lighting systems and more particularly to connecting an LED light fixture to a mains power conductor.

2. Description of Related Art

LED lighting systems are increasingly being used in commercial and household lighting applications due to their high energy efficiency. When powering LED lighting elements, the electric power provided by a conventional mains power conductor generally requires conversion before being provided to an LED lighting element, which typically operate at lower line voltages than incandescent bulbs. When LED lighting systems are retrofitted to existing incandescent lighting systems, conversion of mains power into a suitable form for powering the LED elements generally involves use of an electrical power converter. In some cases, the power converter is mounted within the packaging of the LED lighting element such that the LED element may be accepted as a screw-in replacement for an incandescent light bulb.

There remains a need for methods, apparatus, and systems for connecting between LED light fixtures and mains power conductors.

SUMMARY OF THE INVENTION

In accordance with one aspect of the invention there is provided an adaptor apparatus for connecting a light fixture having a light emitting diode (LED) lighting element to a mains power conductor in an electrical junction box. The apparatus includes a support configured to attach to the electrical junction box and an electrical converter operable to receive electrical power from the mains power conductor and to generate an output power suitable for powering the LED lighting element. The apparatus also includes an output connector disposed on the support and in electrical connection with the electrical converter for receiving the output power, the output connector being operable to receive a connector of the light fixture for powering the LED lighting element. The output connector is oriented to receive the connector of the light fixture when the support is attached to the electrical junction box.

In accordance with another aspect of the invention there is provided a light emitting diode (LED) light fixture apparatus for attaching to an adaptor attached to an electrical junction box, the adaptor having an output connector operable to provide an output power for powering the LED light fixture apparatus. The output connector has a configuration indicative of the output power generated by the adaptor. The LED apparatus includes at least one LED lighting element having an associated power requirement and a connector. The connector has a configuration that is indicative of the power requirement, the configuration of the connector corresponding to a configuration of the output connector of an adaptor configured to generate an output power matching the power requirement associated with the LED lighting element.

In accordance with another aspect of the invention there is provided a lighting system. The lighting system includes an adaptor for connecting a light fixture having a light emitting diode (LED) lighting element to a mains power conductor in an electrical junction box. The adaptor includes a support configured to attach to the electrical junction box and an electrical converter operable to receive electrical power from the mains power conductor and to convert the electrical power into output power suitable for powering the LED lighting element. The apparatus also includes an output connector disposed on the support and in electrical connection with the electrical converter for receiving the output power. The lighting system also includes a light emitting diode (LED) light fixture apparatus. The LED light fixture apparatus includes at least one LED lighting element having an associated power requirement, and a connector having a configuration that is indicative of the power requirement, the configuration of the connector corresponding to a configuration of the output connector of the adaptor. The output connector of the adaptor is operable to receive the connector of the light fixture for powering the LED lighting element. The output connector is oriented to receive the connector of the light fixture when the support is attached to the electrical junction box.

In accordance with another aspect of the invention there is provided a method for connecting a light fixture having a light emitting diode (LED) lighting element to a mains power conductor in an electrical junction box. The method involves connecting an input of an electrical converter to the mains power conductor for receiving electrical power from the mains power conductor, the electrical converter having an output connected to an output connector disposed on a support. The electrical converter is operable to generate an output power at the output connector that is suitable for powering the LED lighting element. The method also involves attaching the support to the electrical junction box such that the output connector is oriented to receive a connector of the light fixture for powering the light fixture.

In accordance with another aspect of the invention there is provided an apparatus for connecting a light fixture having a light emitting diode (LED) lighting element to a mains power conductor in an electrical junction box. The apparatus includes provisions for connecting an input of an electrical converter to the mains power conductor for receiving electrical power from the mains power conductor, the electrical converter having an output connected to an output connector disposed on a support. The electrical converter is operable to generate an output power at the output connector that is suitable for powering the LED lighting element. The apparatus also includes provisions for attaching the support to the electrical junction box such that the output connector is oriented to receive a connector of the light fixture for powering the light fixture.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
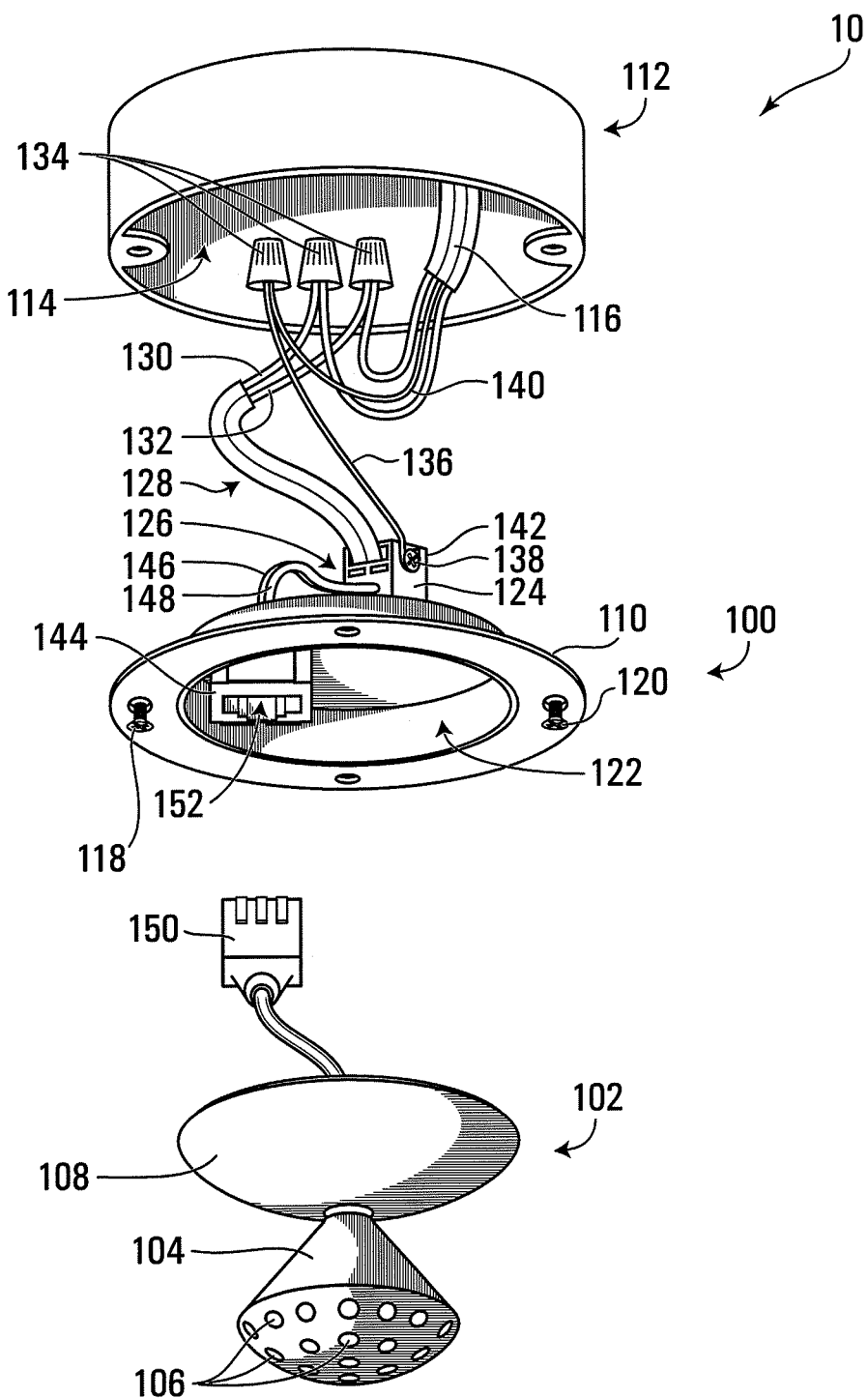
FIG. 1 is a perspective view of a lighting system according to a first embodiment of the invention.

Referring to FIG. 1, a lighting system according to a first embodiment of the invention is shown generally at 10. The lighting system 10 includes an adaptor apparatus 100 and a light emitting diode (LED) light fixture apparatus 102.

The LED light fixture apparatus 102 includes at least one LED lighting element 104. In the embodiment shown, the lighting element 104 includes a plurality of Light Emitting Diodes (LEDs) 106 but in other embodiments the lighting element may include a single LED. In this embodiment the light fixture apparatus 102 also includes a ceiling canopy 108, which when installed hides the adaptor apparatus 100 from view.

The adaptor apparatus 100 includes a support 110, which is configured to attach to an electrical junction box 112. The electrical junction box 112 defines a volume 114 for housing electrical connections to a mains power conductor 116. In the embodiment shown in FIG. 1, the electrical junction box 112 is suitable for installation in a ceiling, but in other embodiments the electrical junction box may be disposed in a wall for mounting a sconce type light fixture or in some other location, such as a cabinet for example.

In the embodiment shown the support 110 is configured to be attached to the electrical junction box 112 using screw fasteners 118 and 120. Alternatively, the support 110 may be attached to the electrical junction box 112 by a snap-in type fastener or any other attaching means. In the embodiment shown the support 110 comprises a plate configured to cover an opening of the electrical junction box 112 when attached to the electrical junction box. The support 110 also includes a recess 122, but in other embodiments the recess may be omitted and the support may be generally flat or otherwise shaped.

The adaptor apparatus 100 also includes an electrical converter 124 operable to receive electrical power from the mains power conductor 116 and to generate an output power suitable for powering the LED lighting element. In the embodiment shown, the electrical converter 124 is mounted on the support 110. In other embodiments the electrical converter 124 may be flexibly connected or detached from the support 110.

In the embodiment shown in FIG. 1, the electrical converter 124 includes an input connector 128 for electrically connecting the electrical converter to the mains power conductor 116. In this embodiment, the input connector 128 comprises a pair of insulated conductors 130 and 132, extending outwardly from the electrical converter 124. The conductors 130 and 133 have uninsulated portions (not shown) that facilitate connection to corresponding conductors of the mains power conductor 116 using a twist type connector 134 such as a Marrette® connector. In the embodiment shown, the input connector 128 also includes a ground conductor 136 for connecting a ground terminal 138 of the electrical converter 124 to a ground wire 140 of the mains power conductor 116. In some embodiments, where permitted by local electrical codes, the ground conductor 136 may be omitted. The electrical converter also includes an output 126 at which the output power suitable for powering the LED lighting element is produced.

In general the mains power conductor 116 supplies alternating current (AC) power at mains voltage (e.g. 110 Volts rms in the case of North American installations). In such embodiments the electrical converter 124 may comprise a transformer and rectifier configured to step the voltage down from 110 V AC to a DC rectified voltage level at the output 126 that is suitable for powering the LED lighting element 104. For example, the LED lighting element 104 may include a parallel/serial combination of LEDs 106 configured for a DC voltage of about 24V, in which case the converter 124 would receive 110 V AC at the input connector 128 and generate 24 V DC at the output 126. Alternatively, the electrical power may be supplied at other voltage levels suitable for conversion for powering the LED lighting element 104 of the LED light fixture apparatus. In some embodiments the electrical power may be provided in the form of a direct current (DC) supply.

In another embodiment, the electrical converter 124 may include a solid state electrical converter such as a voltage converter that uses solid state electronics to step down the voltage to the required level. For example, the electrical converter may be implemented using one or more semiconductor switching devices configured to generate a rectified DC output voltage.

In the embodiment shown, the components of the electrical converter 124 (such as a transformer and rectifier, for example) are potted or otherwise housed within a packaging material 142. The packaging material 142 protects the components and the connections between the components. In other embodiments the components may not be packaged, but rather mounted on a portion of the support that is enclosed by the volume 114 when the support 110 is attached to the electrical junction box 112.

The adaptor apparatus 100 further includes an output connector 144 disposed on the support 110 and in electrical connection with the output 126 of the electrical converter 124. In the embodiment shown a pair of conductors 146 and 148 connect between the converter output 126 and the output connector 144. In other embodiments the output connector may be integrally formed as part of the electrical converter 124, with connections between the output of the electrical converter and the output connector 144 being internal to the packaging.

The output connector 144 is configured to receive a connector 150 of the light fixture apparatus 102 for powering the LED lighting element 104. In the embodiment shown, the output connector 144 is oriented outwardly to receive the connector 150 of the light fixture apparatus 102 when the support 110 is attached to the electrical junction box 112.

In one embodiment, the output connector 144 includes recessed contacts 152, which reduce the possibility of a person installing the light fixture apparatus 102 inadvertently touching the contacts and thereby receiving an electrical shock during installation. In one embodiment, in order for the voltage level to be considered safe, the voltage level of the output power must be below 120 volts DC or 50 volts rms AC. In other embodiments to be considered safe, the voltage level of the output power may be required to be much lower such as below 30 volts DC or 12.5 Volts rms.

In general the electrical junction box 112 and the mains power conductor 116 would be installed by an electrician during construction. At the same time, or at a later time, the input connector 128 of the adaptor apparatus 100 would be connected to the mains power conductor 116, and the support 110 secured in place using the screw fasteners 118 and 120. When attached to the electrical junction box 112, the support 110 provides an insulating barrier between the electrical connections housed within the electrical junction box 112 and the person installing the light fixture apparatus 102. Under these conditions, the only voltage levels accessible to the person installing the LED light fixture apparatus 102 is the low DC voltage at the output connector 144. Access to the volume 114 of the electrical junction box 112 is thus provided for an electrician or other person while installing the adaptor apparatus 100, but once installed the support 110 of the adaptor covers the electrical junction box, thereby reducing the possibility of electrical shock to a person installing the light fixture apparatus 102. While the electrical junction box 112 may still be accessed by removing the support 110, such access would not be required when installing or replacing the light fixture apparatus 102. Advantageously, the system 10 thus permits safe and easy installation of LED light fixtures by persons who would not normally consider performing electrical installations.

Figure 2:
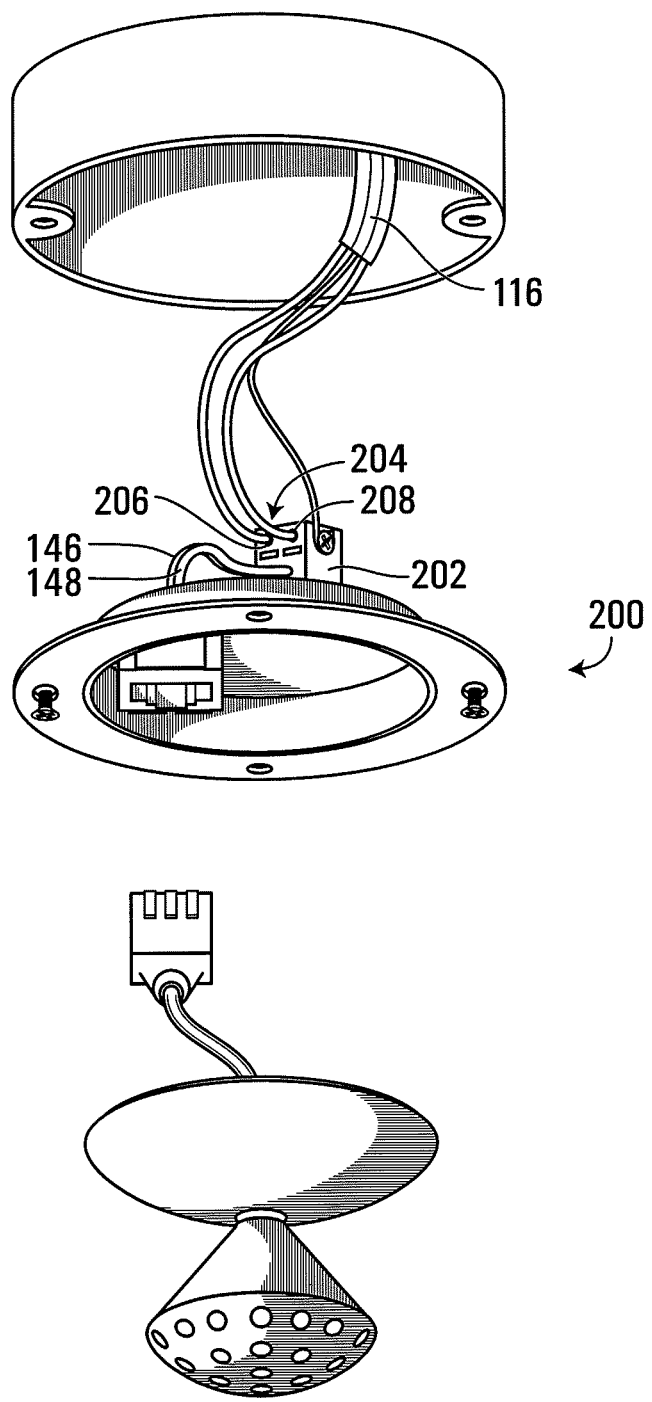
FIG. 2 is a perspective view of an adaptor apparatus and an LED light fixture apparatus according to an alternative embodiment of the invention.

Referring to FIG. 2, an adaptor apparatus according to another embodiment of the invention is shown generally at 200. The adaptor apparatus 200 includes an electrical converter 202 having an input connector 204, which includes conductive terminals 206 and 208. The conductive terminals 206 and 208 are configured to receive and retain corresponding conductors of the mains conductor 116 such that the conductive terminals make an electrical connection with the corresponding conductors of the mains conductor. In one embodiment the conductive terminals 206 and 208 comprise push pin terminals, while in other embodiments the conductive terminals may be another connector such as a terminal block or a screw terminal.

Figure 3:
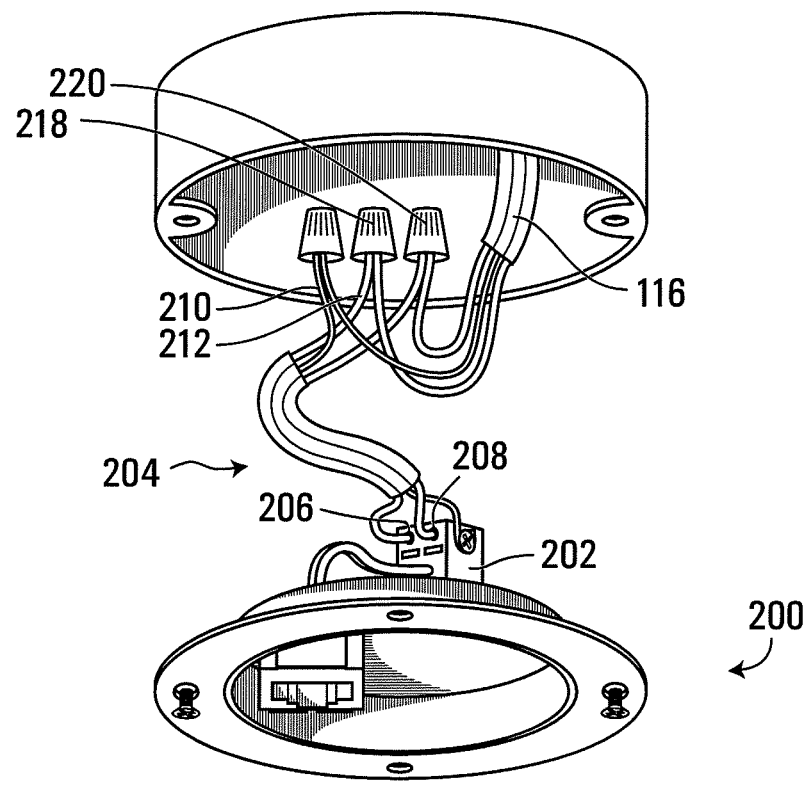
FIG. 3 is a perspective view of an adaptor apparatus and a LED light fixture apparatus according to another alternative embodiment of the invention.
Figure 3:
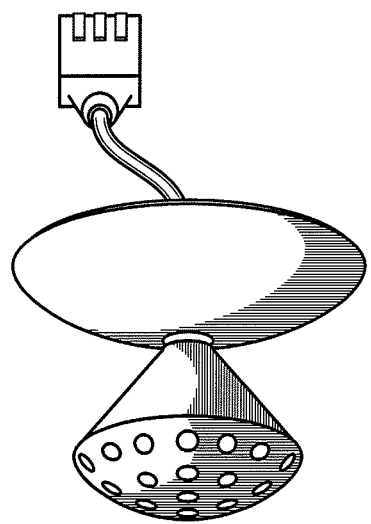

In some jurisdictions, electrical codes require that connections within an electrical junction box be made by a pigtail connection. Referring to FIG. 3, an example of a pigtail connection embodiment is shown. The input connector 204 of the adaptor apparatus 200 includes conductors 210 and 212 for connecting the conductive terminals 206 and 208 to the corresponding conductors of the mains power conductor 116. The conductors 210 and 212 have uninsulated portions (not shown) that are operable to be connected to the corresponding conductors of the mains power conductor 116 using twist-on connectors 218 and 220 leaving a pair of free ends for connection to the input connector 204 of the electrical converter 202. The conductors 210 and 212 are received and retained by the conductive terminals 206 and 208 of the input connector 204.

LED lighting elements are available in a variety of configurations having different power requirements for operation. In the embodiment shown in FIG. 1, the lighting element 104 requires electric power at 24 Volts DC in order to operate and would also generally have an associated power rating (or current rating). The combination of different voltages and different power ratings for LED lighting elements may present a problem in that the electrical converter power output should match the voltage and power rating of the LED lighting element. Similarly, other power requirements associated with a LED lighting element, such as an AC or DC supply type, or power frequency requirement may be relevant in certain circumstances.

In FIG. 1, in one embodiment the configuration (i.e. size, shape and/or color) of the connector 144 on adaptor apparatus 100 is selected to be indicative of the output power provided by the electrical converter 124. For example, the configuration of the connector 144 may indicate that the electrical converter 124 produces a 24V, 10 W power output at the output connector 144. Similarly, the connector 150 of the light fixture apparatus 102 may have a corresponding configuration (i.e. size, shape and/or color) to output connector 144 that is indicative of a requirement that power be supplied to the lighting element at 24 Volts DC and/or at a certain power level (e.g. 10 Watts). Thus the connector 150 is operable to be received by and electrically connect to the output connector 144 such that the output connector can supply the lighting element 104 with appropriate output power at 24 Volts DC. For a lighting element 104 that required a different input voltage (12 Volts DC for example), the configuration of the connector 150 may be different from that shown in FIG. 1.

Figure 4A:
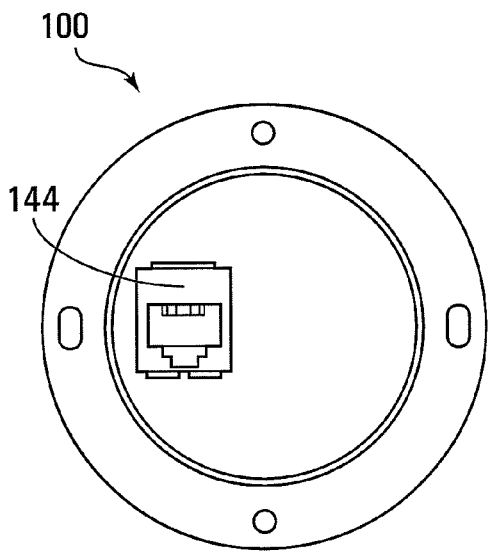
FIGS. 4A-4D are a series of plan views of the adaptor apparatus shown in FIG. 1, according to various embodiments of the invention.

Referring to FIG. 4A the adaptor apparatus 100 including the output connector 144 is shown in bottom plan view. Similarly, referring to FIGS. 4B-4D adaptors 250, 260, and 270 each include respective output connectors 252, 262, and 272 respectively. The adaptors 100, 250, 260, and 270 are each are configured to generate a different output power and the output connectors 144, 252, 262, and 272 have respective configurations that are indicative of the output power provided by the respective adaptor apparatuses.

Each of the output connectors 252, 262, and 272 correspond with and receive the output power from a respective electrical converter (not shown) and have a configuration that is indicative of the output power provided by the respective electrical converter. The configuration of the output connectors 144, 252, 262, and 272 may differ in shape, size, or coloring of at least a portion of the output connector, for example. In other embodiments, features such as connector keying or other differences may be used to configure the connectors.

Accordingly, each of the output connectors 252, 262, and 272 is configured to receive, electrically connect to, and provide the output power to a correspondingly configured connector of an LED light fixture apparatus having a lighting element with a power requirement that is matched by the output power provided by the respective adaptor apparatus.

Figure 4B:
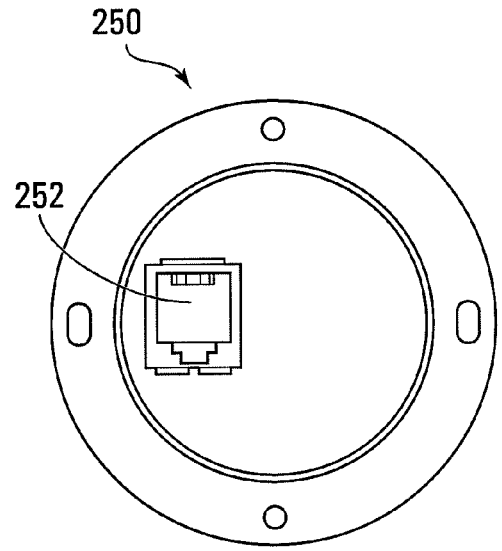
Figure 4C:
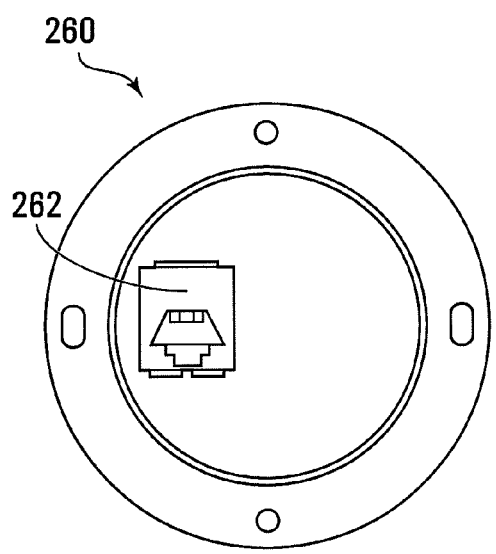
Figure 4D:
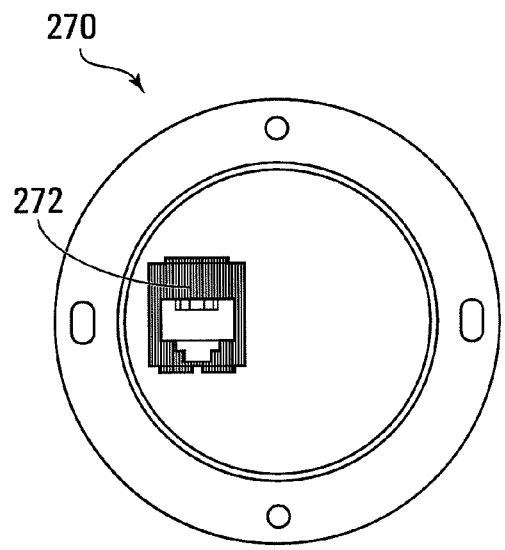

Referring to FIGS. 4A and 4B, according to one embodiment of the invention, the output connector 252 shown in FIG. 4B has a size configuration that is different from the size configuration of the output connector 144 in FIG. 4A, the difference in size being indicative of an output power provided by the output connector. Referring to FIG. 4C, according to another embodiment of the invention, the output connector 262 has a shape configuration that is different from the shape configuration of the output connector 144 in FIG. 4A, the difference in shape being indicative of an output power provided by the output connector. Referring to FIG. 4D, according to another embodiment of the invention, the output connector 272 has a coloring of at least a portion of the output connector that is different from the coloring of the output connector 144 shown in FIG. 4A, the difference in color being indicative of an output power provided by the output connector.

In general, any combination of size, shape and color of an output connector may be used as an indication of the output power provided by that output connector. The adaptors 100, 250, 260, and 270 shown in FIG. 4 are each configured to generate one of a plurality of different output powers and the configuration of the respective output connectors 144, 252, 262, and 272 is indicative of the output power provided. In some embodiments, the light fixture apparatus connector 150 may have a configuration that corresponds only to the output connector 144 from among the plurality of output connectors 144, 252, 262, and 272 of adaptors 100, 250, 260, and 270 that matches the power requirement of the light fixture apparatus 102. In such embodiments, it would not be possible to connect the lighting fixture 102 to any but an adaptor that produces the appropriate power output. The person installing the light fixture apparatus 102 would thus notice the lack of correspondence or would be unable to insert the connector into the output connector and electrically connect the connector to the output connector.

Advantageously, the lighting system 10 shown in FIG. 1 thus avoids connection of the light fixture apparatus 102 to an adaptor unsuitable for powering the light fixture. The adaptor apparatus 100 also covers potentially unsafe electrical connections and provides access only to safe voltages and connections for the user who would not usually install lighting fixtures. Advantageously, some of the above aspects of the invention would permit home owners to easily upgrade their own lighting fixtures in the home, without requiring knowledge of safe electrical connection procedures.

While specific embodiments of the invention have been described and illustrated, such embodiments should be considered illustrative of the invention only and not as limiting the invention as construed in accordance with the accompanying claims.

What is claimed is:

1. An adaptor apparatus for connecting a light fixture having a light emitting diode (LED) lighting element to an electrical junction box having an opening exposing a volume for housing electrical connections to a mains power conductor, the apparatus comprising:
   a plate configured to removably attach to the electrical junction box to cover the opening of the electrical junction box;
   an electrical converter mounted on said plate and being operable to receive electrical power when connected to the mains power conductor and to generate an output power suitable for powering the LED lighting element; and
   an output connector disposed on said plate and in electrical connection with said electrical converter for receiving said output power, said output connector being operable to receive a connector of the light fixture for powering the LED lighting element, said plate, when attached to the electrical junction box, being operable to:
   permit access to the output connector from outside the electrical junction box; and
   prevent access to the volume housing electrical connections within the electrical junction box.

2. The apparatus of claim 1 wherein said electrical converter is mounted on said plate.

3. The apparatus of claim 2 wherein the electrical junction box defines a volume for housing electrical connections and wherein said electrical converter is oriented to at least partially project into said volume when said plate is attached to the electrical junction box.

4. The apparatus of claim 1 wherein said electrical converter comprises one of:
   a transformer; and
   a solid state electrical converter.

5. The apparatus of claim 1 wherein said electrical converter is operably configured to produce output power having a voltage level that is sufficiently low to be considered safe for a person installing the light fixture.

6. The apparatus of claim 1 wherein said output connector comprises recessed contacts to prevent possibility of electrical shock to a person installing the light fixture.

7. The apparatus of claim 1 wherein said electrical converter comprises an input connector operable to electrically connect an input of the electrical converter to the mains power conductor.

8. The apparatus of claim 7 wherein said input connector comprises a conductive terminal configured to receive and retain a portion of said mains conductor for electrically connecting to the mains power conductor.

9. The apparatus of claim 7 wherein said input connector comprises a conductor having an uninsulated portion operable to be connected to the mains power conductor using a twist-on connector.

10. The apparatus of claim 1 wherein said output connector is configured to accept a correspondingly configured connector of a light fixture, said output connector configuration being indicative of the output power provided by said electrical converter.

11. The apparatus of claim 10 wherein said output connector configuration comprises at least one of:
    a shape configuration; and
    a size of the output connector, and
    a coloring of at least a portion of the output connector.

12. An apparatus for connecting a light fixture having a light emitting diode (LED) lighting element to a mains power conductor in an electrical junction box having an opening exposing a volume for housing electrical connections to a mains power conductor, the apparatus comprising:
    means for connecting an input of an electrical converter to the mains power conductor for receiving electrical power when connected to the mains power conductor, the electrical converter having an output connected to an output connector disposed on a plate, the electrical converter being operable to generate an output power at said output connector that is suitable for powering the LED lighting element; and
    means for attaching said plate to the electrical junction box such that said output connector is oriented to receive a connector of the light fixture for powering the light fixture, said plate, when removably attached to the electrical junction box, being operable to:
    permit access to the output connector from outside the electrical junction box; and
    prevent access to the volume housing electrical connections within the electrical junction box.

* * * * *